March 1, 1927. C. C. MANCHESTER Re. 16,564
METAL FLOAT
Original Filed March 23, 1925
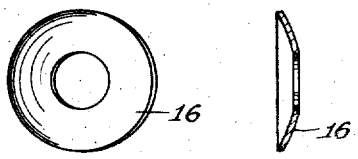
Fig. I.
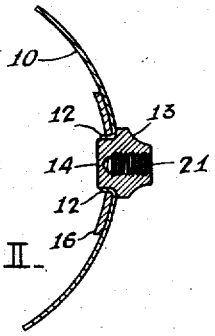
Fig. II.
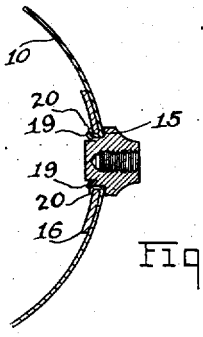
Fig. III.
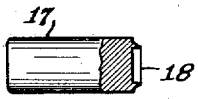
Fig. IV.
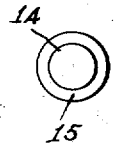
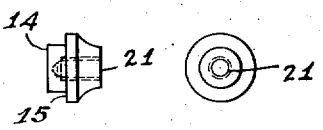
Fig. VII.
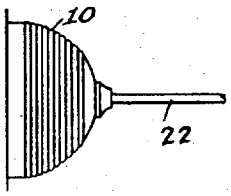
Fig. V.
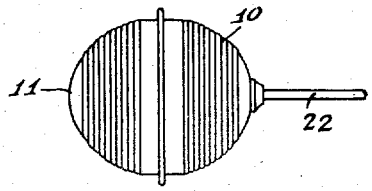
Fig. VI.
INVENTOR.
CLYDE C. MANCHESTER
BY J. W. Milburn
ATTORNEY.

Reissued Mar. 1, 1927. Re. 16,564

UNITED STATES PATENT OFFICE.

CLYDE C. MANCHESTER, OF TOLEDO, OHIO, ASSIGNOR, BY MESNE ASSIGNMENTS, TO THE AYLING & REICHERT COMPANY, OF TOLEDO, OHIO, A CORPORATION OF OHIO (INCORPORATED 1926).

METAL FLOAT.

Original No. 1.567,968, dated December 29, 1925, Serial No. 17,468, filed March 23, 1925. Application for reissue filed August 13, 1926. Serial No. 129,064.

This invention relates to improvements in metal floats such as are commonly employed in flush tanks, and has to do particularly with the spud or plug by which the float is secured to the float arm or rod and the mounting of the plug in the float proper.

One of the objects of the invention is the utilization of a relatively short plug so as to save material and weight.

Another object is the provision of a plug in which the metal thrown up by the riveting tool is all located at the periphery of the plug, whereby a minimum of material may be employed between the inner face of the plug and the threaded socket for the float rod.

Still another object is the provision of a pair of continuous annular float gripping surfaces on the plug between which surfaces is received the rebent edge of the float shell so that the latter may be compressed all around the plug producing a continuous fluid tight packing.

Other objects, and objects relating to details of manufacture, will appear as I proceed with the description of that embodiment of the invention which, for the purposes of the present application, I have illustrated in the accompanying drawing, in which—

Figure I is an illustration of a washer used in connection with my invention, and showing the same in front perspective and diametrical section.

Fig. II is a sectional view through a portion of a float showing the rod holding plug in place, but not riveted to the float shell.

Fig. III is a similar view showing the float after the riveting operation has been performed.

Fig. IV is an elevational view, partly in section, of a riveting tool which I prefer to employ in carrying out my invention.

Fig. V is an elevational view on a smaller scale of one section of the metal float with the float rod and attaching plug in place.

Fig. VI is a view similar to Fig. V, but showing the entire float assembled.

Fig. VII illustrates the attachment plug in rear, side and front elevations respectively.

Similar reference characters refer to like parts throughout the several views.

In the drawing, 10 represents one section of a metal float, preferably stamped up out of relatively soft, non-rusting metal, such as copper or brass. The other section 11 of the float is joined to the first by peripheral interlocking flanges, preferably with a rubber gasket interposed in a manner well known in the art.

The die (not shown) for stamping 10 is so formed as to punch a hole in the central part of the section and bend the metal into an inwardly extending, continuous, annular flange 12 (Fig. II).

The plug 13 having an inner portion 14 (Figs. II and VII) to fit snugly within the flange 12, is next inserted in the hole until an annular shoulder 15 extending entirely around the plug engages with the float shell. A washer 16, dished to conform to the curvature of the shell is placed over the flange 12. Then a riveting tool 17 (Fig. IV) with a circular cutting edge 18 is properly centered on the inner portion 14 of the plug and hammered or pressed sufficiently to turn back a flange 19, shown in Fig. III, around the periphery of the plug, at the same time producing a rebend 20 of the shell metal around the edge of the washer 16.

Before it is assembled with the shell, the plug 13 is provided with a screw threaded socket 21, extending from the outer surface of the plug to a point close to the inner surface thereof. The arm or rod 22 upon which the float is to be mounted, is threaded to fit the socket 21 as is the usual practice. The attachment of the plug 12 to the float section 10 is, of course, performed before the two sections 10 and 11 are assembled together.

Heretofore it has been customary to perform the riveting operation with ordinary riveting tools, which work the metal outward from the center of the inner end of the plug. Of course sufficient metal must be provided between the end of the plug and the inner end of the threaded socket, so that there will be no danger of breaking through into the socket when the plug is riveted. In my invention the riveting is at the periphery of the inner end of the plug and radially outward from the threaded socket. Hence, there is no possibility that the riveting tool will cut through into the socket, and consequently the length of the plug is governed only by the necessary length of the threaded socket. I therefore effect a saving in material. When the rebent edge of the float shell is compressed between the shoulder 15 and the flange 19 during the riveting operation, the relatively soft copper or brass of the shell is pressed into close unison with these two gripping walls of the plug and with the intermediate periphery of the plug, thus effectually sealing the joint.

As will be readily understood, the locations of the shoulder and flange on the plug might be reversed without changing the spirit of the invention. Washer 16 might also be omitted in cases where the shell itself supplies sufficient rigidity.

I claim as my invention:

1. The method of securing a spud to a thin metal float, which consists in forming the float with an inwardly flanged aperture of a dimension to closely fit the spud, placing a heavy washer around said flanged aperture, inserting the spud into said aperture, centering a riveting tool with respect to the inner face of the spud, the working face of said tool being adapted to spread radially outward the metal of the spud, and applying force to the tool to press the metal of the spud radially outward against the said washer with the flanged metal of the float compressed therebetween.

2. The method of securing a spud to a thin metal float, which consists in forming the float with an inwardly flanged aperture of a dimension to closely fit the spud, placing a heavy washer around said flanged aperture, inserting the spud into said aperture, centering a circular riveting tool upon the inner face of the spud, the cutting edge of said tool being of a diameter slightly less than the diameter of the inner surface of the spud, and applying force to the tool to form the outer walls of the spud into an annular flange and to press said wall outwardly against the said washer with the flanged metal of the float compressed therebetween.

3. In a metal float, an attachment plug located in a hole in the float shell, means forming a stop against inward motion of the plug, said plug having a socket extending from the outer surface to a point near the inner surface thereof at the middle of the plug and a peripheral flange for gripping the float wall around said hole, the body of said plug projecting inwardly beyond the base of the gripping flange.

4. In combination, a metal float having a perforation, an attachment plug having an annular shoulder bearing against one side of said float around said perforation, said plug containing an axial socket extending from its outer surface to a point near its inner surface and a peripheral flange for gripping the float wall around said hole, the body of said plug projecting inwardly beyond the base of said gripping flange.

5. In a metal float, an attachment plug located in a hole in the float shell, means forming a stop against inward motion of the plug and a peripheral flange on the plug gripping the float wall around said hole, said plug having an axial socket extending from the outer surface inwardly to a point short of the inner end of the plug but beyond the base of said peripheral flange.

In testimony whereof, I affix my signature.

CLYDE C. MANCHESTER.